US009866255B1

(12) United States Patent
Ketter-Muldrow (10) Patent No.: US 9,866,255 B1
(45) Date of Patent: Jan. 9, 2018

(54) SMART PHONE CASE AND WALLET (71) Applicant: Tina Ketter-Muldrow, Desoto, TX (US)

(72) Inventor: Tina Ketter-Muldrow, Desoto, TX (US)

(*) Notice: Subject to any disclaimer, the term of this patent is extended or adjusted under 35 U.S.C. 154(b) by 0 days.

(21) Appl. No.: 15/226,194

(22) Filed: Aug. 2, 2016

(51) Int. Cl.
E05B 65/52     (2006.01)
H04B 1/3888    (2015.01)
A45C 11/00     (2006.01)
A45C 13/00     (2006.01)
A45C 13/30     (2006.01)
A45C 13/10     (2006.01)

(52) U.S. Cl.
CPC ............ H04B 1/3888 (2013.01); A45C 11/00 (2013.01); A45C 13/002 (2013.01); A45C 13/005 (2013.01); A45C 13/10 (2013.01); A45C 13/30 (2013.01); A45C 2011/002 (2013.01); A45C 2013/1015 (2013.01)

(58) Field of Classification Search
CPC ............... A45C 11/182; A45C 11/321; A45C 2001/067; A45C 2001/086; A45C 2011/001; A45C 2011/002; A45C 2011/003; A45C 2013/1015
See application file for complete search history.

(56) References Cited

U.S. PATENT DOCUMENTS

D688,655 S      8/2013  Rey-Hipolito
8,923,938 B2   12/2014  Kelley
8,989,826 B1    3/2015  Connolly
9,049,283 B1    6/2015  Dae-Young
9,277,804 B1*   3/2016  Gennodie ................ A45C 1/02
2003/0040286 A1* 2/2003 Walter ................. H04B 1/3877
                                                    455/575.1
2005/0016647 A1* 1/2005 Carey ...................... A45C 1/08
                                                    150/113
2011/0142375 A1* 6/2011 Lebow ................. B65D 55/145
                                                    383/64
2014/0083876 A1  3/2014  Lin
2014/0367004 A1 12/2014  Miki
2015/0128666 A1* 5/2015  Thomson ............ E05B 65/5284
                                                    70/67
2015/0136620 A1* 5/2015  Williams ................ H05K 5/02
                                                    206/216
2015/0156301 A1  6/2015  Crawford

FOREIGN PATENT DOCUMENTS

WO          2015084775 A1    6/2015

* cited by examiner

Primary Examiner — Bobbak Safaipour
(74) Attorney, Agent, or Firm — Kyle A. Fletcher, Esq.

(57) ABSTRACT

The smart phone case and wallet is a protective case that is able to protect a smart phone or other electronic device while doubling as a wallet. The smart phone case and wallet is constructed of a first member and a second member that attach to one another via a hinge. The smart phone case and wallet includes a strap that extends from a side of the second member, and which includes a locking armature on a distal end. The locking armature is able to be inserted into a locking receptacle provided on an outer surface of the first member in order to lock the protective case in a closed position. The first member includes a wallet compartment provided on an inner surface of the first member as well as a wallet flap. The wallet flap is sandwiched between the first member and the second member in order to compartmentalize the portion dedicated to a protective case from the portion dedicated to a wallet.

8 Claims, 7 Drawing Sheets

SMART PHONE CASE AND WALLET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of smart phone cases, more specifically, a smart phone case that is able to double as a wallet, and lock itself in a closed state.

SUMMARY OF INVENTION

The smart phone case and wallet is a protective case that is able to protect a smart phone or other electronic device while doubling as a wallet. The smart phone case and wallet is constructed of a first member and a second member that attach to one another via a hinge. The smart phone case and wallet includes a strap that extends from a side of the second member, and which includes a locking armature on a distal end. The locking armature is able to be inserted into a locking receptacle provided on an outer surface of the first member in order to lock the protective case in a closed position. The first member includes a wallet compartment provided on an inner surface of the first member as well as a wallet flap. The wallet flap is sandwiched between the first member and the second member in order to compartmentalize the portion dedicated to a protective case from the portion dedicated to a wallet.

It is an object of the invention to provide a protective case that doubles as a wallet.

It is a further object of the invention to provide a lock that is used to secure or close off access to the wallet as well as the electronic device housed therein.

These together with additional objects, features and advantages of the smart phone case and wallet will be readily apparent to those of ordinary skill in the art upon reading the following detailed description of the presently preferred, but nonetheless illustrative, embodiments when taken in conjunction with the accompanying drawings.

In this respect, before explaining the current embodiments of the smart phone case and wallet in detail, it is to be understood that the smart phone case and wallet is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the smart phone case and wallet.

It is therefore important that the claims be regarded as including such equivalent construction insofar as they do not depart from the spirit and scope of the smart phone case and wallet. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
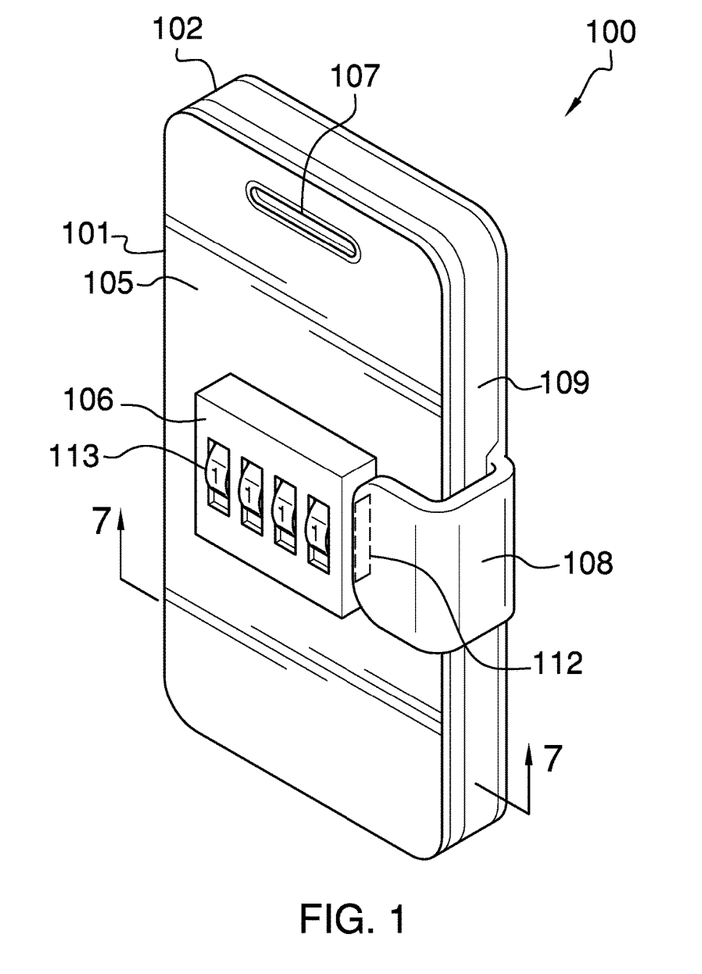
FIG. 1 is a perspective view of an embodiment of the disclosure.
Figure 2:
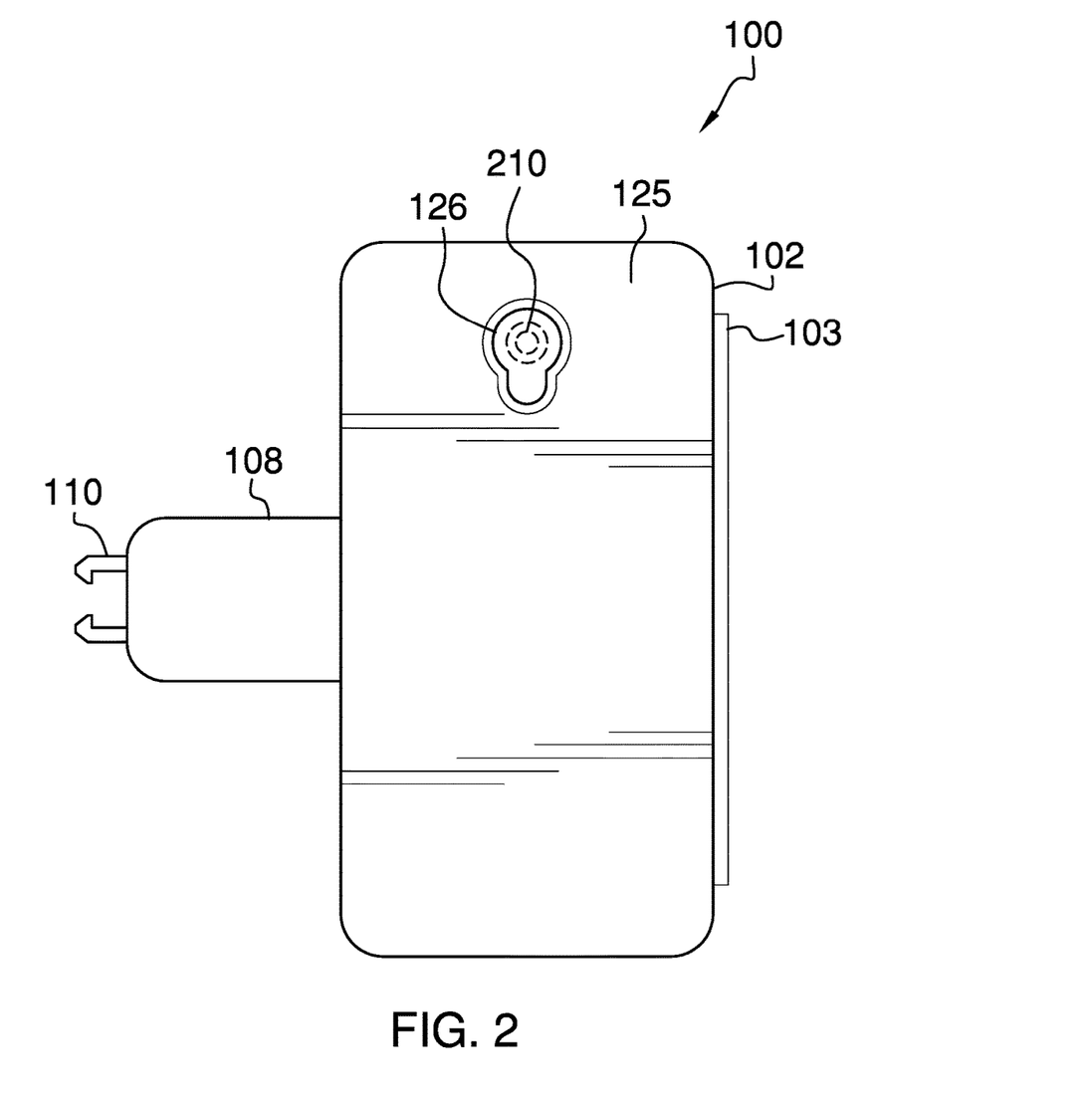
FIG. 2 is a rear view of an embodiment of the disclosure.
Figure 3:
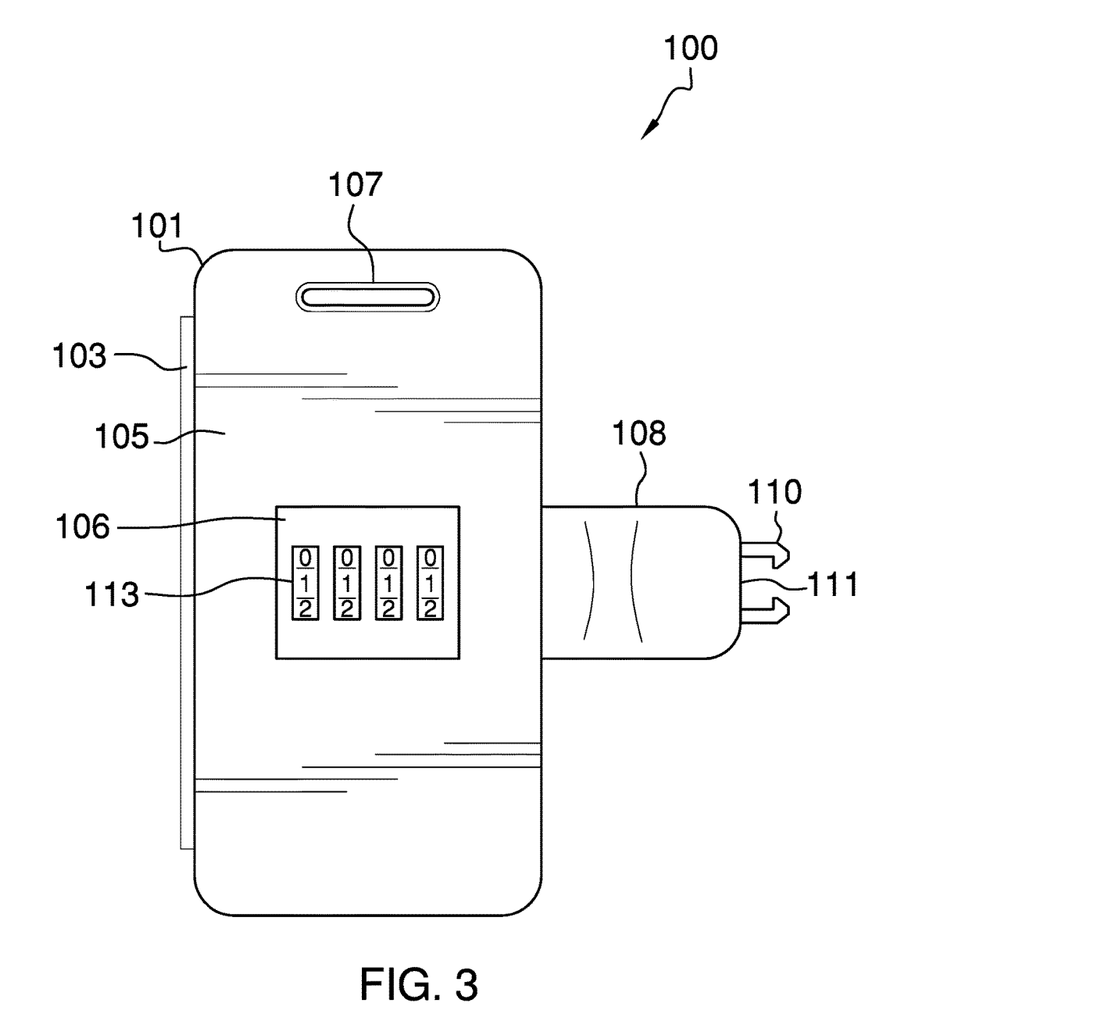
FIG. 3 is a front view of an embodiment of the disclosure.
Figure 4:
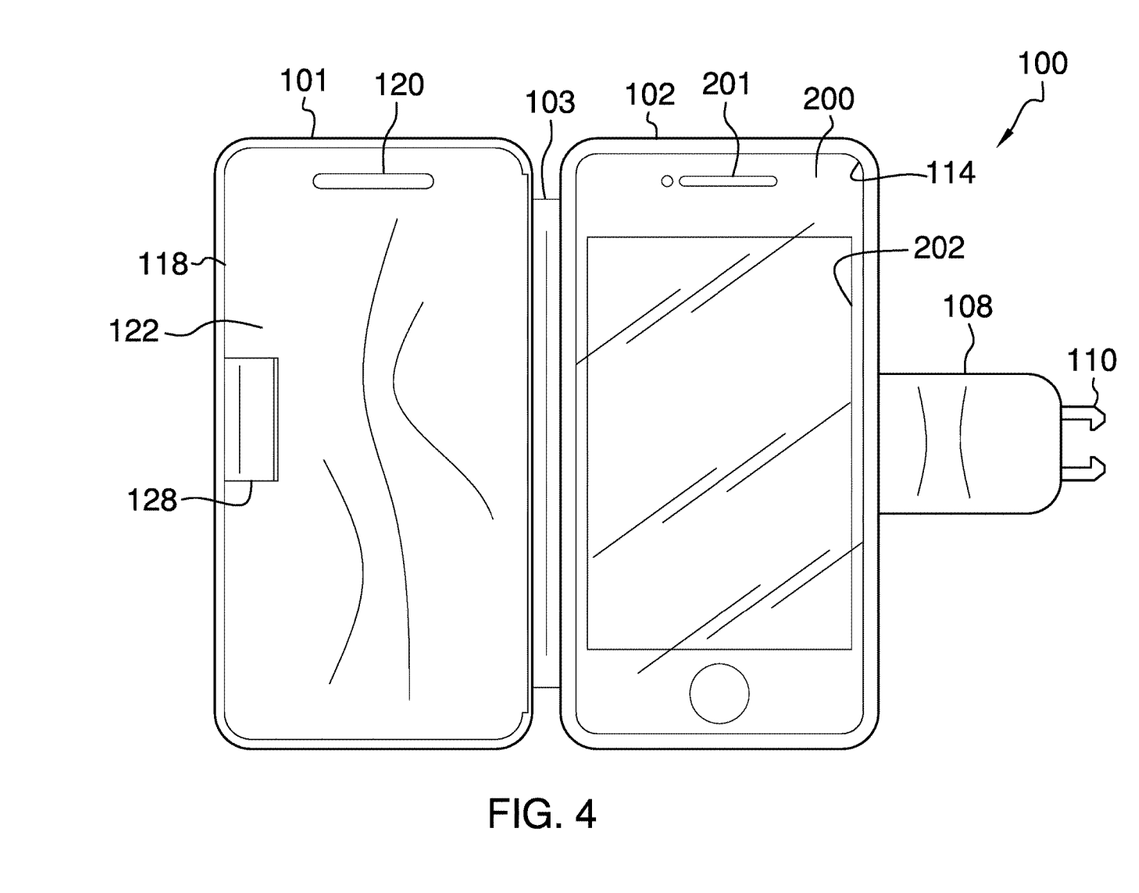
FIG. 4 is a view of an embodiment of the disclosure with a smart phone in an opened position.
Figure 5:
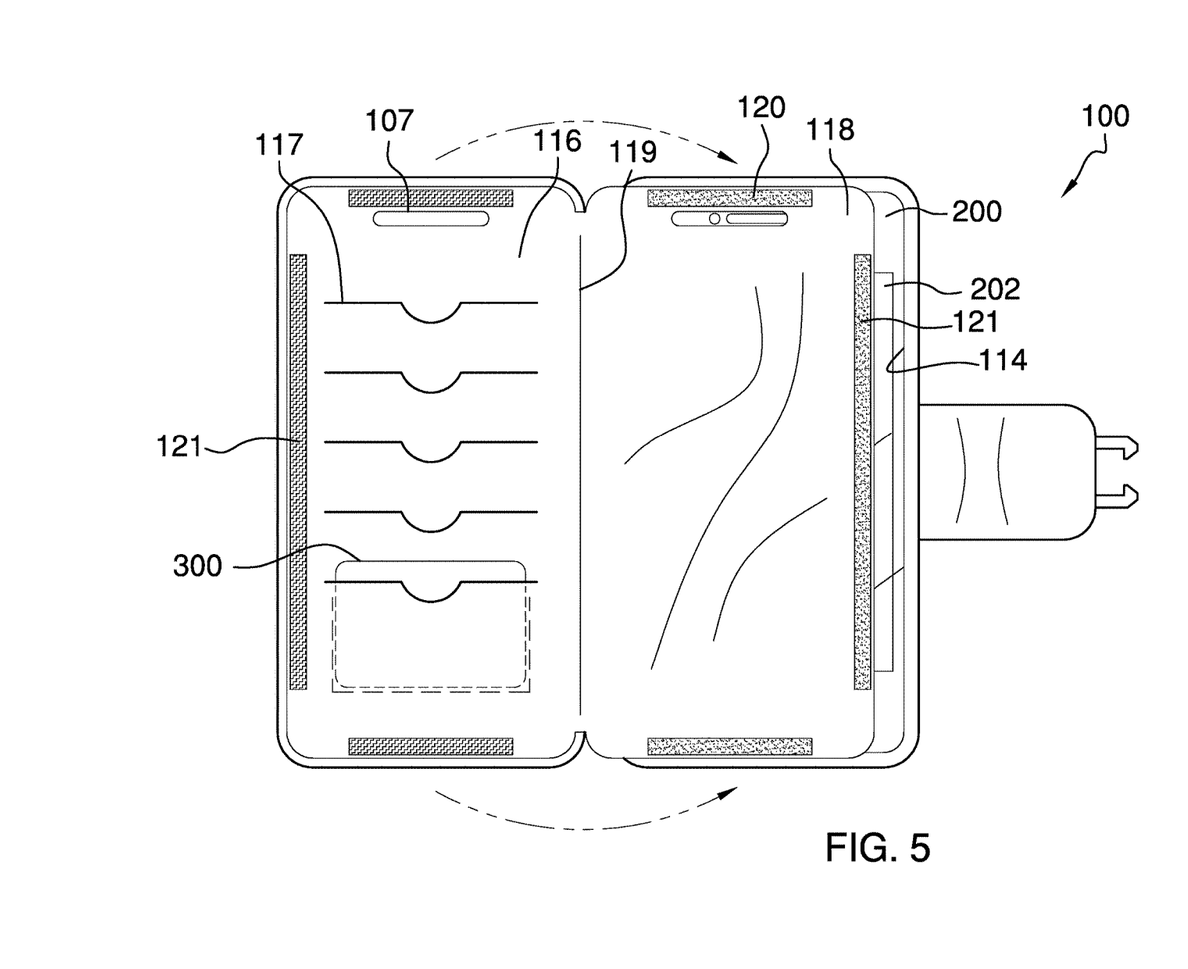
FIG. 5 is a view of an embodiment of the disclosure with the wallet in an opened position.
Figure 6:
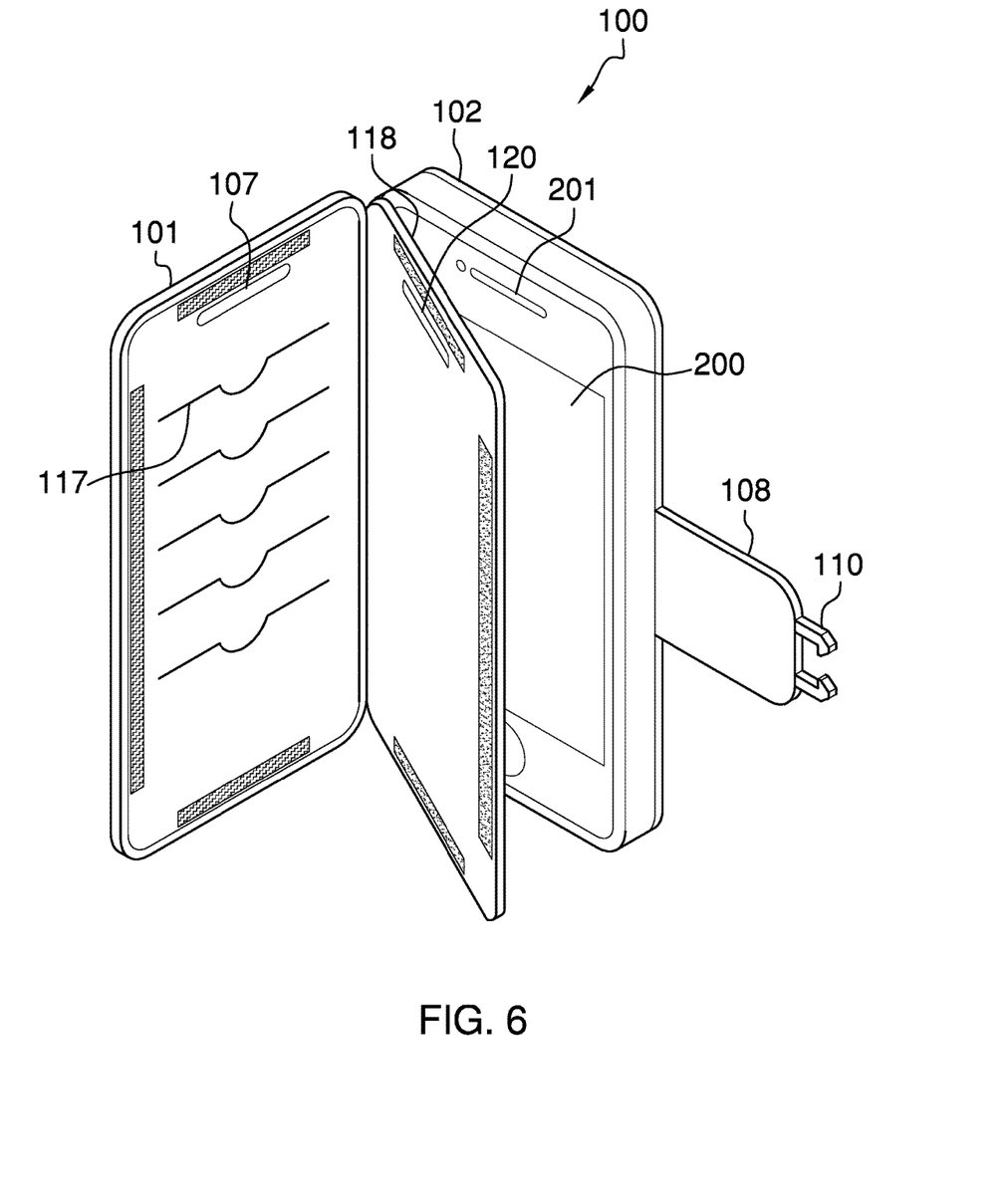
FIG. 6 is a perspective view of an embodiment of the disclosure partially opened.
Figure 7:
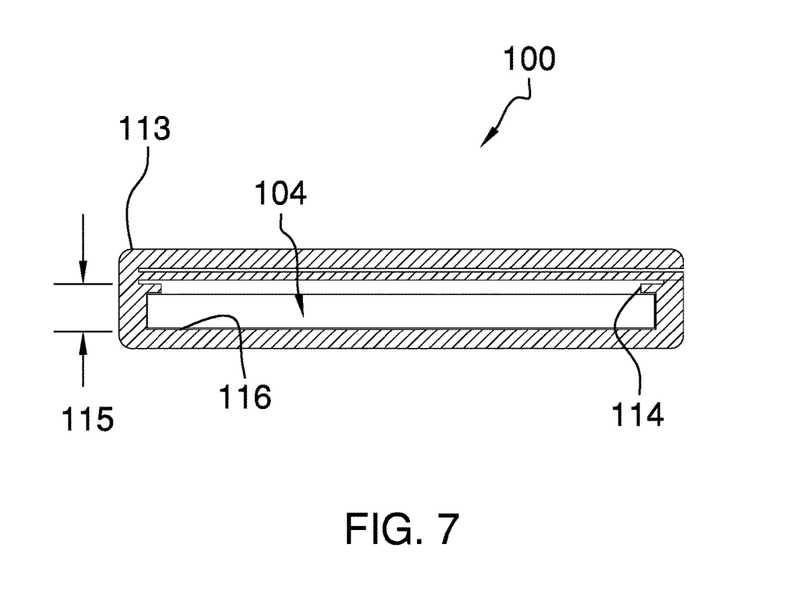
FIG. 7 is a cross-sectional view of an embodiment of the disclosure along line 7-7 in FIG. 1.

Detailed reference will now be made to one or more potential embodiments of the disclosure, which are illustrated in FIG. 1 through 7.

The smart phone case and wallet 100 (hereinafter invention) comprises a first member 101 and a second member 102. The first member 101 and the second member 102 are both attached to a hinge 103. The hinge 103 is sandwiched between the first member 101 and the second member 102. Moreover, the hinge 103 enables the first member 101 to move relative the second member 102, and vice versa. The first member 101 is shaped and sized to correspond with the second member 102 such that a cavity 104 is formed between the first member 101 and the second member 102.

The first member 101 is further defined with a first outer surface 105 that has a locking receptacle 106 thereon. The first member 101 optionally includes a first speaker opening 107, which is adapted to correspond with a speaker 201 of an electronic device 200. It shall be noted that the term electronic device 200 is being used to loosely refer to cellular telephones, smart phones, tablet computers, PDAs, etc. The second member 102 is further defined with a strap 108 that extends from a second side surface 109. The strap 108 includes a locking armature 110 on a distal end 111. The locking armature 110 is able to be inserted into a lock opening 112 provided on the locking receptacle 106, and which secures the first member 101 and the second member 102 in a closed position.

The locking receptacle 106 includes a plurality of rotating wheels 113 that when aligned to form a combination unlocks the locking armature 110 from the locking receptacle 106. The locking receptacle 106, the plurality of rotating wheels 113 are well known in the art of locks, more generally speaking.

The second member 102 is further defined with a raised lip 114 that is positioned a depth 115 away from an inner surface 116 of the second member 102. The raised lip 114 is used to adaptively secure the electronic device 200 in a partially nested relationship with the second member 102. The electronic device 200 is oriented within the second member 102 such that a screen 202 and the speaker 201 of the electronic device 200 face way from the inner surface 116 of the second member 102.

The first member 101 is further defined with a first inner surface 116. The first inner surface 116 is adorned with at least one card slot 117 thereon. The at least one card slot 117 enables an item 300 to be inserted therein, and secured against the first member 101. The term 300 is being used to loosely refer to objects that are relatively shaped like a credit card, driver's license, business card, etc.

The invention 100 includes a wallet flap 118 that is affixed to and rotates with respect to a first inner edge 119 of the first member 101. The first inner edge 119 of the first member 101 is adjacent the hinge 103. The wallet flap 118 includes a flap speaker hole 120. The flap speaker hole 120 is able to align with the first speaker opening 107. Moreover, both the flap speaker hole 120 and the first speaker opening 107 are adapted to align with the speaker 201 of the electronic device 200. It shall be further noted that the wallet flap 118 is able to fold flat against the first inner surface 116. The wallet flap 118 works with the at least one card slot 117 of the first inner surface 116 to form a wallet functionality that works in concert with storage of the electronic device 200.

Both the wallet flap 118 and the first inner surface 116 include fastening members 121 thereon. The fastening members 121 is ideally nylon hook and loop strips that when aligned secure the wallet flap 118 against the first inner surface 116 of the first member 101. The wallet flap 118 is further defined with an outer flap surface 122 that is adapted to interface with the display 202 of the electronic device 200 when the invention 100 is in a closed position. The outer flap surface 122 of the wallet flap 118 includes a flap tab 123, which is used to pull the wallet flap 118 outwardly with respect to the first inner surface 116 of the first member 101.

The second member 102 is further defined with a second outer surface 125 that includes a camera hole 126 thereon. The camera hole 126 is adapted to be aligned with a camera 210 of the electronic device 200, which is well known in the art.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A protective case comprising:
    a first member and a second member that rotate relative one another via a hinge;
    wherein the first member and the second member collectively work in concert to store an electronic device as well as to operate as a wallet that stores at least one item;
    wherein the first member and the second member are both attached to the hinge such that the hinge is sandwiched between the first member and the second member;
    wherein the hinge enables the first member to move relative the second member, and vice versa;
    wherein the first member is shaped and sized to correspond with the second member such that a cavity is formed between the first member and the second member;
    wherein the first member is further defined with a first outer surface that has a locking receptacle thereon;
    wherein the first member includes a first speaker opening, which corresponds with a speaker of said electronic device;
    wherein the second member is further defined with a strap that extends from a second side surface;
    wherein the strap includes a locking armature on a distal end;
    wherein the locking armature is able to be inserted into a lock opening provided on the locking receptacle, and which secures the first member and the second member in a closed position;
    wherein the locking receptacle includes a plurality of rotating wheels that when aligned to form a combination unlocks the locking armature from the locking receptacle;
    wherein the second member is further defined with a raised lip that is positioned a depth away from an inner surface of the second member;
    wherein the raised lip is used to secure the electronic device in a partially nested relationship with the second member;
    wherein the electronic device is oriented within the second member such that a screen and the speaker of the electronic device face way from the inner surface of the second member;
    wherein the first member is further defined with a first inner surface;
    wherein the first inner surface is adorned with at least one card slot thereon;
    wherein the at least one card slot enables said item to be inserted therein, and secured against the first member.

2. The protective case according to claim 1 wherein a wallet flap is affixed to and rotates with respect to a first inner edge of the first member.

3. The protective case according to claim 2 wherein the first inner edge of the first member is adjacent the hinge.

4. The protective case according to claim 3 wherein the wallet flap includes a flap speaker hole; wherein the flap speaker hole is able to align with the first speaker opening; wherein both the flap speaker hole and the first speaker opening align with the speaker of the electronic device; wherein the wallet flap is able to fold flat against the first inner surface.

5. The protective case according to claim 4 wherein both the wallet flap and the first inner surface include fastening members thereon; wherein the fastening members is further defined as nylon hook and loop strips that when aligned secure the wallet flap against the first inner surface of the first member.

6. The protective case according to claim 5 wherein the wallet flap is further defined with an outer flap surface that interfaces with the display of the electronic device when the protective case is in a closed position.

7. The protective case according to claim 6 wherein the outer flap surface of the wallet flap includes a flap tab, which is used to pull the wallet flap outwardly with respect to the first inner surface of the first member.

8. The protective case according to claim 7 wherein the second member is further defined with a second outer surface that includes a camera hole thereon; wherein the camera hole aligns with a camera of the electronic device.

* * * * *